United States Patent [19]
Schwenker

[11] Patent Number: 5,384,656
[45] Date of Patent: Jan. 24, 1995

[54] ASTIGMATISM CORRECTED GRATINGS FOR PLANE GRATING AND SPHERICAL MIRROR SPECTROGRAPHS

[75] Inventor: John P. Schwenker, Boulder, Colo.

[73] Assignee: Hyperfine, Inc., Boulder, Colo.

[21] Appl. No.: 64,353

[22] Filed: May 18, 1993

Related U.S. Application Data

[63] Continuation of Ser. No. 778,302, Oct. 16, 1991, abandoned.

[51] Int. Cl.$^6$ ............... G02B 5/18; G02B 27/44; G01J 3/28; G01J 3/40
[52] U.S. Cl. ................... 359/569; 356/305; 356/328; 359/570; 359/572
[58] Field of Search ............... 359/570, 566, 569, 572; 356/305, 328, 329, 331, 334

[56] References Cited

U.S. PATENT DOCUMENTS

| | | |
|---|---|---|
| 2,453,164 | 11/1948 | Swings . |
| 2,548,548 | 4/1951 | Menzies et al. . |
| 2,671,376 | 3/1954 | Merton ............... 359/570 |
| 3,048,080 | 8/1962 | White . |
| 3,495,909 | 2/1970 | Axelrod . |
| 3,521,943 | 7/1970 | Kelderman . |
| 3,567,323 | 3/1971 | Chupp et al. . |
| 3,625,615 | 12/1971 | Wilson ............... 359/570 |
| 3,973,850 | 8/1976 | Pouey . |
| 3,985,443 | 10/1976 | Danielsson et al. . |
| 4,068,954 | 1/1978 | Da Silva ............... 356/334 |
| 4,119,366 | 10/1978 | Lemaitre . |
| 4,183,668 | 1/1980 | Lindblom . |
| 4,192,994 | 3/1980 | Kastner ............... 359/570 |
| 4,241,999 | 12/1980 | Pouey ............... 359/570 |
| 4,310,244 | 1/1982 | Perkins et al. ............... 356/334 |
| 4,540,282 | 9/1985 | Landa et al. ............... 356/334 |
| 4,636,074 | 1/1987 | Levy et al. . |
| 4,673,292 | 6/1987 | Pouey ............... 356/334 |
| 4,743,083 | 5/1988 | Schimpe . |
| 4,838,645 | 6/1989 | Machler et al. . |
| 4,932,768 | 6/1990 | Gobell . |
| 5,030,006 | 7/1991 | Mitchell ............... 356/334 |

FOREIGN PATENT DOCUMENTS 204318 11/1983 Germany ............... 359/570

OTHER PUBLICATIONS

Lindblom et al., "New Eagle-Type Monochromator Mounted with Ruled Diffraction Grating at 45° Off-Plane," *Applied Optics*, vol. 19, No. 12, Jun. 15, 1980, pp. 1941 to 1945.

Chipman, "Monochromator Designs with Aberration Corrected Gratings," *SPIE vol. 237: International Lens Design Conference*, 1980, pp. 439–445.

William G. Fastie, "Ebert Spectrometer Reflections," *Physics Today*, Jan. 1991 pp. 37–43.

Huber, et al., "Toroidal Grating Obtained on an Elastic Substrate," *Applied Optics* vol. 20, 1981, pp. 2139–2142.

Huber, et al., "Imaging Extreme Ultra-Violet Spectrometer Employing A Single Toroidal Diffraction Grating: An Initial Evaluation," *Applied Optics* vol. 27, 1988, pp. 3503–3509.

*Primary Examiner*—Martin Lerner
*Attorney, Agent, or Firm*—James R. Young

[57] ABSTRACT

A modified diffraction grating having a predetermined amount of astigmatic power correction is substituted for the plane diffraction grating in an Ebert type spectrograph having a single concave collimating and focusing mirror for directing a light beam onto the surface of the modified diffraction grating. The surface of the modified diffraction grating is curved to introduce the proper amount of astigmatic power correction to converge the sagittal focus and the tangential focus of the diffracted beam to produce a stigmatic image. The modified diffraction grating may have a pure cylindrical surface or a toroidal surface. Another embodiment replaces the plane grating in a two mirror Czerny-Turner type of instrument with a modified grating according to this invention to reduce or eliminate astigmatism in that type of instrument as well.

6 Claims, 5 Drawing Sheets

ASTIGMATISM CORRECTED GRATINGS FOR PLANE GRATING AND SPHERICAL MIRROR SPECTROGRAPHS

This application is a continuation of application Ser. No. 07/778,302, filed Oct. 16, 1991, now abandoned.

BACKGROUND OF THE INVENTION

1. Field of the Invention

This invention relates to astigmatism corrected gratings for plane grating-spherical mirror spectrometric instruments, and more specifically to astigmatism corrected plane gratings for use in the Ebert, Ebert-Fastie and Czerny-Turner class of spectrometric instruments.

2. Brief Description of the Prior Art

Many different types of spectrometric instruments have been used for well over a century for many different purposes such as, for example, spectrometers for determining the wavelengths of light passed through materials to gain knowledge of the characteristics or chemical compositions of such materials or for determining the characteristics of the light source. Most spectrometers use diffraction gratings to disperse the light by its respective wavelength components. The diffraction gratings are usually of the reflective type and have a flat reflective surface with a series of diffractive elements, such as parallel lines or rulings inscribed thereon and spaced closely enough together to cause diffraction of the wavelengths of interest by means of constructive and destructive interference. Reflective diffraction gratings have proven very useful and desirable in spectroscopy because of their lack of chromatic aberration, their ability to proportionally disperse light by wavelength, even at large angles, and their ability to disperse very wide spectral ranges.

Diffractive grating spectrometers can also be used as monochromators, which can be thought of as precise optical filters. Essentially, the layout of the monochromator is very similar to that of a conventional spectrometer, except that an exit pupil or slit is sized and positioned in a manner that blocks out all but a specific wavelength of the diffracted light. In this manner, monochromators are useful as sources of monochromatic light to study the effects that one wavelength of light has on other elements. For example, monochromatic light from a monochromator may be passed through a gaseous sample to excite the various atoms therein. Light emitted from the excited atoms may then be analyzed by passing it through a spectrometer. Such emission spectroscopy often requires a fairly energetic monochromatic light source to properly excite a sample so that it emits sufficient light. Because of this high energy requirement, monochromators are sought to have as much light output, or throughput, as possible.

The particular class of diffractive spectrometric instruments that are related to the present invention are generically referred to as plane grating-spherical mirror instruments. Because of their ruggedness and simplicity, these plane grating-spherical mirror instruments have proven to be the workhorses of laboratory, field, and remote sensing applications. Instruments falling into this particular class include configurations or mountings known as Ebert, Ebert-Fastie, and Czerny-Turner. Generally speaking, these instruments comprise an entrance slit, one or more concave spherical mirrors, a plane diffraction grating, and an exit slit or photographic plate in the plane of the entrance slit. The primary advantages associated with these instruments is that they combine high spectral resolution and acceptable throughput with relatively simple and rugged optic designs that are easy to assemble and adjust. Therefore, these designs have been the preferred choice for many applications, including monochromators and spectrometers for research in atomic and molecular spectroscopy and for use on spacecraft.

The Ebert spectrometer was first described by Hermann Ebert in 1889. Essentially, Ebert's spectrometer consisted of an entrance slit, a single concave spherical mirror, a plane diffraction grating, and a small photographic plate in the plane of the entrance slit. The single concave mirror was used to both collimate and focus the light. In 1930, Czerny and Turner used a modification of the Ebert system in which the collimating and focusing were performed by two separate mirrors instead of by the two halves of the single, large mirror originally used by Ebert. This so-called Czerny-Turner system eliminated coma, since the coma distortion of the wave front arriving at the off-axis grating was canceled by the symmetrically off-axis focusing mirror. Fastie replaced the photographic plate by an exit slit to form a monochromator. Hence, these spectrometric instruments may be referred to as Ebert, Czerny-Turner, or Eben-Fastie, depending on their particular mountings or configurations.

Unfortunately, because the mirror or mirrors of these spectrometric systems are always used off-axis, they introduce a significant amount of astigmatism into the diffracted image. That is, the tangential and sagittal foci, which represent components of light in orthogonal planes, do not occur at the same point in space. This astigmatism causes a substantial loss in the intensity of the diffracted beam as the resolved light in each wavelength or band is stretched out in a protracted line image instead of being concentrated at a point. This loss of intensity and stretching out of the wavelength band results in a total loss of any information relating the diffracted image to specific height positions along the entrance slit. Thus, imaging spectroscopy, where simultaneous spectroscopy of two sources or a complex image falling on the entrance slit, is impossible with uncorrected diffractive spectrometers of this class. The loss of intensity also reduces the available light or throughput in monochromator applications, thereby further limiting usefulness. Moreover, the increased resolving power of new gratings requires the use of narrower lines which further accentuates the intensity loss problem.

Fastie worked to minimize the effect of astigmatism and compensate for spectral line curvature for all wavelengths by using curved slits that formed arcs of the same circle. Fastie also used an "over-and-under" variation of the original Ebert mounting in which the photographic plate was mounted above, and the slit was mounted below the level of the grating. Unfortunately, Fastie's efforts in reducing the effects of astigmatism have been mainly directed at increasing net throughput. The long curved slits of his design also allow isochromatic astigmatic images to pass through without significant loss of spectral resolution. True astigmatism reduction has traditionally taken a back seat to studies aimed at reducing aberrations that are more directly related to spectral resolution, such as developing new methods of precisely optimizing the mirror radii, optic positions, and aperture stop positions.

While these plane grating-spherical mirror spectrometric instruments do have the disadvantage of introducing substantial astigmatism into the diffracted image, as described above, they have such excellent resolution, and are so simple and rugged that the disadvantages of the astigmatism have generally been tolerated for most applications. However, if the astigmatism could be eliminated, detection efficiency, throughput, and signal-to-noise ratio could be improved, because both the sagittal and tangential foci would be brought together to converge the diffracted image to a focused, high luminosity point instead of the protracted line. Also, comparative spectroscopy, where two sources are projected through two halves of the same entrance slit, would also be enhanced. Stigmatic imaging could also allow for two-dimensional spectroscopy, that is, where spectral and slit position information are gathered simultaneously. Thus, a person or electronic detector equipment could identify the light spectrum or wavelength bands present or absent at each point along an elongated entrance slit, instead of having to use a point entrance or source. Such an elongated entrance slit could, for example, be wiped or moved across an image of the sun or across a candle flame or other non-point light source, while taking continuous or intermittent real time measurements of wavelengths at selected points along the entrance slit or even continuously along the entrance slit to obtain a two-dimensional reading of all the wavelengths present at all points on the sun or candle flame image. Further, continuing development of miniature multi-element detection systems have greatly enhanced the desirability of systems having "spatial imaging" abilities as described above. The limitations caused by the astigmatism threaten to make this simple but efficient class of spectrometric instruments obsolete.

Prior to this invention, there have only been two options available to reduce the amount of astigmatism associated with this class of instruments. The first of these previously known methods was discovered by Fastie and, as described above, relies on curved slits that form arcs of the same circle. However, this method only minimizes the effects of astigmatism on throughput, and does not really get to the root of the problem of converging the sagittal and tangential foci.

In the second alternative, the spherical mirrors in the Czerny-Turner instruments have been reshaped or distorted in an attempt to achieve stigmatic or near stigmatic imaging. By varying the shapes of the mirrors to something other than an exact spherical surface, for example by closing the radius of the mirror in one dimension, it has been possible to reduce the astigmatism in the instrument. Such aspherical surfaces, usually ellipsoidal or toric, have been used with limited success. However, it is relatively difficult and expensive to properly "distort" i.e., reshape the spherical mirrors, and such mirror reshaping can only be practically done in a two-mirror Czerny-Turner system. That is, it is difficult, if not impossible to correctly distort the single mirror of the Ebert mounting to reduce astigmatism, because the distortions would have to be carried out at two locations on the mirror. Furthermore, it is difficult to realign the two distorted mirrors of the modified Czerny-Turner system to optimize stigmatic imaging, which difficult re-alignment removes some of the advantages of ruggedness and simplicity associated with this class of instruments. Therefore, this mirror reshaping technique has only enjoyed limited success in improving the imaging qualities of these instruments.

Until this invention, spectroscopists had generally concluded that astigmatism, since it is present in all off-axis uses of spherical reflecting surfaces, is inescapable with plane grating-spherical mirror spectrometric instruments. Spectroscopists have generally accepted the astigmatism as the price to be paid for the high resolution, high throughput, simplicity and ruggedness of these instruments.

SUMMARY OF THE INVENTION

Accordingly, it is a general object of this invention to provide an improved method and apparatus for reducing or eliminating the astigmatism associated with plane grating-spherical mirror spectrometric instruments.

It is another general object of this invention to provide improved spectroscopic apparatus with greater flexibility and capabilities and that minimizes or eliminates the shortcomings and limitations of the prior art plane grating spectrometric instruments.

It is a further general object of this invention to provide an improved diffraction grating that can be substituted for the plane grating in plane grating-spherical mirror spectrometric instruments to minimize or eliminate astigmatism without the need to refocus the device and without changing the wavelength scale linearity.

A more specific object of this invention is to provide an improved diffraction grating having astigmatic power correction that provides stigmatic imaging with the Ebert and Czerny-Turner types of spectrometric instruments.

Another specific object of this invention is to provide an improved mounting that will allow two-dimensional and other non-conventional forms of spectroscopy, such as two sources through the same entrance slit for comparison spectroscopy.

It is also an object of this invention to provide an improved mounting for diffraction spectroscopy that provides an improved signal-to-noise ratio through the elimination of the intensity loss caused by astigmatism.

Additional objects, advantages, and novel features of this invention shall be set forth in part in the description that follows, and in pan will become apparent to those skilled in the art upon examination of the following or may be learned by the practice of the invention. The objects and the advantages of the invention may be realized and attained by means of the instrumentalities and in combinations particularly pointed out in the appended claims.

To achieve the foregoing and other objects and in accordance with the purposes of the present invention, as embodied and broadly described herein, the stigmatic and near stigmatic imaging system according to this invention may comprise an Ebert type spectrograph having a single concave collimating and focusing mirror for directing a light beam onto the surface of a modified diffraction grating. The surface of the modified diffraction grating is curved to introduce the proper amount of astigmatic power correction to converge the sagittal focus and the tangential focus of the diffracted beam. The modified diffraction grating may have either a purely cylindrically curved surface, or a toroidal surface. Another embodiment replaces the plate grating in a two mirror Czerny-Turner type instrument with a modified grating according to this invention to reduce or eliminate astigmatism in that type of instrument as well.

BRIEF DESCRIPTION OF THE DRAWINGS

The accompanying drawings, which are incorporated herein and form a part of the specification illustrate preferred embodiments of the present invention, and together with the description, serve to explain the principles of the invention. In the drawings.

DETAILED DESCRIPTION OF THE PREFERRED EMBODIMENT

Figure 1:
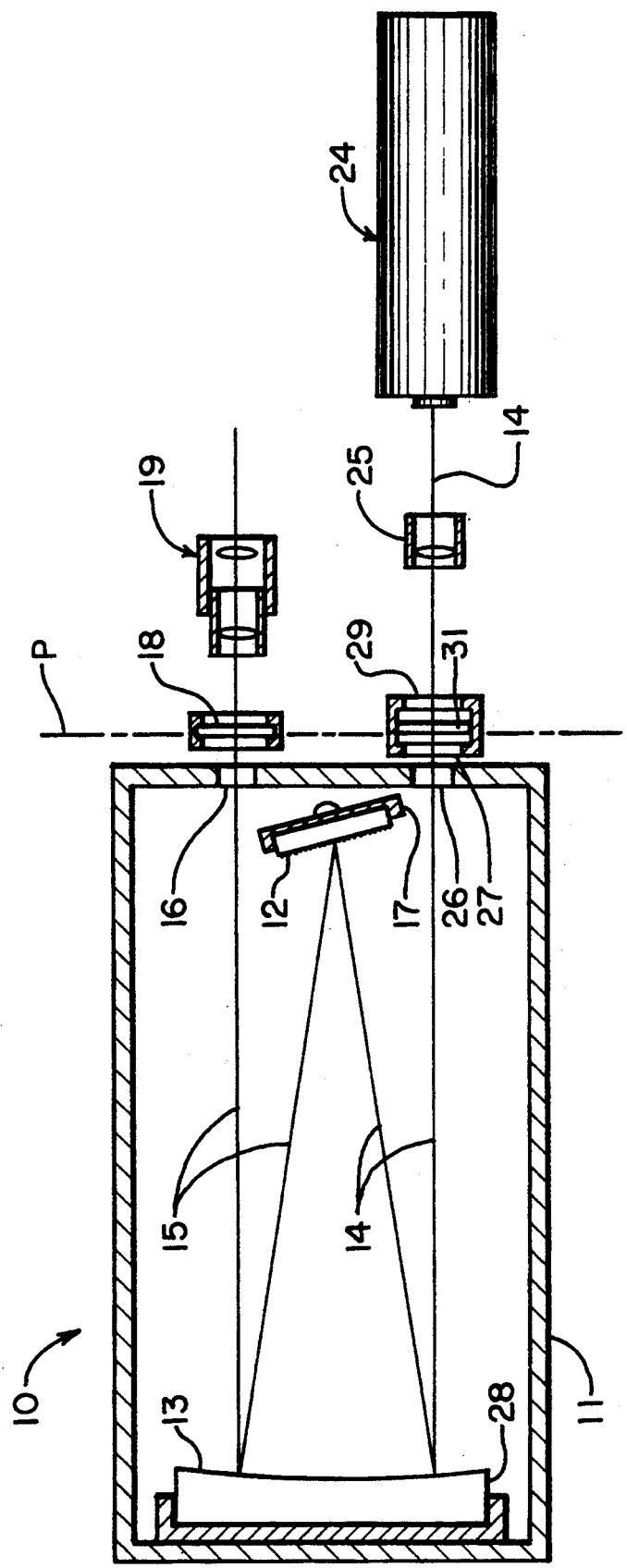
FIG. 1 is a plan view of a "test rig" of an Ebert-type spectrometer having a modified plane grating according to the present invention to achieve stigmatic imaging.

The stigmatic and near stigmatic imaging system 10 utilizing a modified plane diffraction grating 12 having astigmatic power correction according to the present invention is illustrated in FIG. 1. Essentially, the instrument shown in FIG. 1 is a "test rig" for evaluating the stigmatic imaging properties of a modified Ebert spectrometer. An incident light beam 14 may be projected by a conventional projecting apparatus, such as a laser 24 through beam spreading lens 25, optional diffuser plate 29 and optional graticule plate 27, and entrance pupil 26 onto the surface 13 of a spherical concave mirror 28 mounted in instrument housing 11. The mirror 28 collimates the beam and reflects it back to a modified diffraction grating 12 having a predetermined astigmatic power correction, as will be described in detail below, where the beam is diffracted and separated into its component wavelengths. The diffracted beam 15 is then reflected back to the spherical mirror 28 which directs the diffracted beam 15 through an exit pupil or aperture 16 and stigmatically focuses the diffracted beam 15 on the surface of translucent screen 18, which is coplanar with normal focal plane P. A microscope assembly 19 focused on the screen 18 allows the image of the graticule plate 27 to be seen by the eye of an observer or a camera (not shown).

As mentioned above, the particular instrument shown in FIG. 1 contains components, such as graticule plate 27 and diffuser plate 29, necessary to more easily evaluate the stigmatic imaging properties achieved by replacing the plane diffraction grating with the modified grating 12, as will be described in detail below, and would not necessarily require or include such components when used for other spectrometric applications. Furthermore, since this invention improves the imaging qualities achievable by these prior art spectrometers, no attempt is made herein to describe the wide-variety of applications for such instruments, nor is any attempt made to show and describe the myriad combinations of components necessary to accomplish such applications. The addition or omission of such components for a particular application would be obvious to those persons having ordinary skill in this art after having become familiar with the details of this invention, and the present invention should not be regarded as limited to the relatively few applications suggested herein.

The primary advantage of this invention is that it allows the astigmatism associated with spherical mirror plane grating instruments to be reduced or eliminated by simply replacing the plane grating with a modified grating according to this invention having the proper astigmatic power correction. In most cases, there will be no need to refocus the instrument, and, just as importantly, the substitution of the modified grating will not affect the wavelength scale linearity of the instrument. Another important advantage of this invention is that it allows single mirror plane grating instruments, such as the Ebert and Ebert-Fastie types, to realize the benefits of reduced astigmatism, therefore allowing these instruments to be used in applications requiring stigmatic and near stigmatic imaging properties.

The details of the apparatus and method of the stigmatic and near stigmatic imaging system 10 are relatively complex and are best understood by first describing well-known prior art spectrometric apparatus and methods. Then, after having described the prior an apparatus and methods, the details of the stigmatic and near stigmatic imaging system 10 and the applications thereof to various spectrometric requirements will be understood more easily. For the purposes of this description, the term "stigmatic" as used herein refers to the condition of an optical system in which the horizontal and vertical components of all rays of light from a single point are focused upon a single point. That is, the sagittal and tangential foci of the optical system are coincident. The term "near stigmatic" as used herein refers to very slightly degraded imaging that occurs in spectral or spatial locations other than that for which the design was optimized. Also, the term "astigmatic power correction" as used herein refers to the net difference between the curvatures along two orthogonal axes of an optical element. For example, a diffraction grating having a circular curvature along an axis parallel to the rulings, but no curvature along an orthogonal axis, has astigmatic power correction and is referred to herein as a cylindrical grating. Similarly, a diffraction grating having a circular curvature along an axis parallel to the rulings and a different circular curvature along an axis orthogonal to the rulings also has astigmatic power correction and is referred to herein as a toroidal grating.

Figure 2:
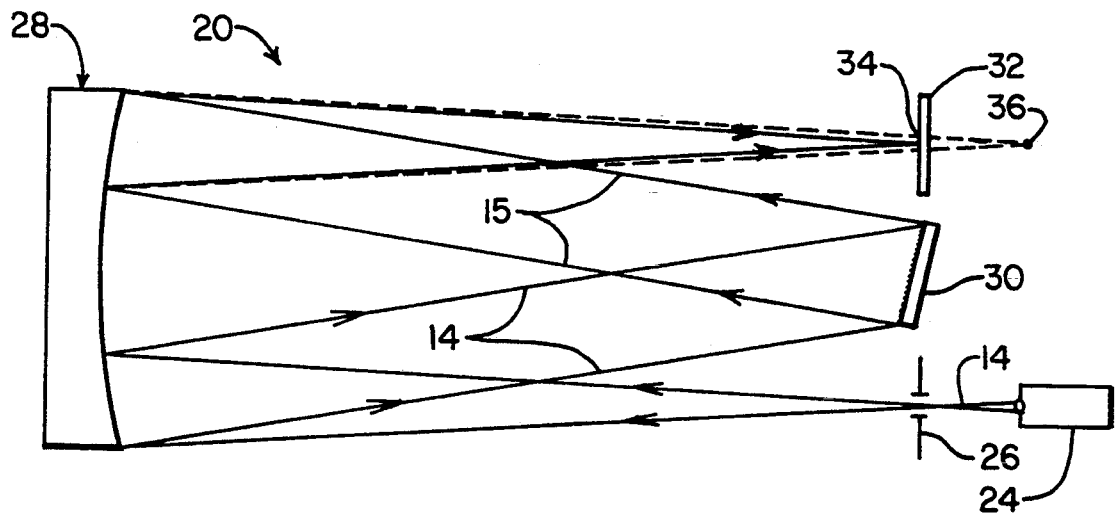
FIG. 2 is a schematic plan view of an Ebert-type instrument according to the prior art showing the displacement of the sagittal focus, shown in broken lines, from the tangential focus, shown in solid lines.

A typical well-known prior art spectrometer 20 based on the Ebert mounting is shown schematically in FIG. 2. In a generic use, a source illumination to be studied, such as beam 14 from a source 24, is imaged through an entrance slit at the entrance pupil 26 onto a spherical concave mirror 28. The mirror 28 collimates the beam and reflects it back to a normally ruled plane diffraction grating 30, which diffracts the beam and separates it into its component wavelengths. The diffracted beam 15 is then focused by mirror 28 onto the surface of a detector, such as photographic plate 32, or passes through an exit aperture or slit (not shown in FIG. 2), as is well-known. Note that with this prior art Ebert instrument 20, only the tangential focus 34 occurs at the surface of the photographic plate 32. The sagittal focus 36 occurs behind the plate 32, as seen in FIG. 2, yielding good spectral resolution in line images parallel to the entrance slit, however, because the tangential focus 34 and the sagittal focus 36 do not coincide, the image on photographic plate 32 is said to be astigmatic.

Figure 3:
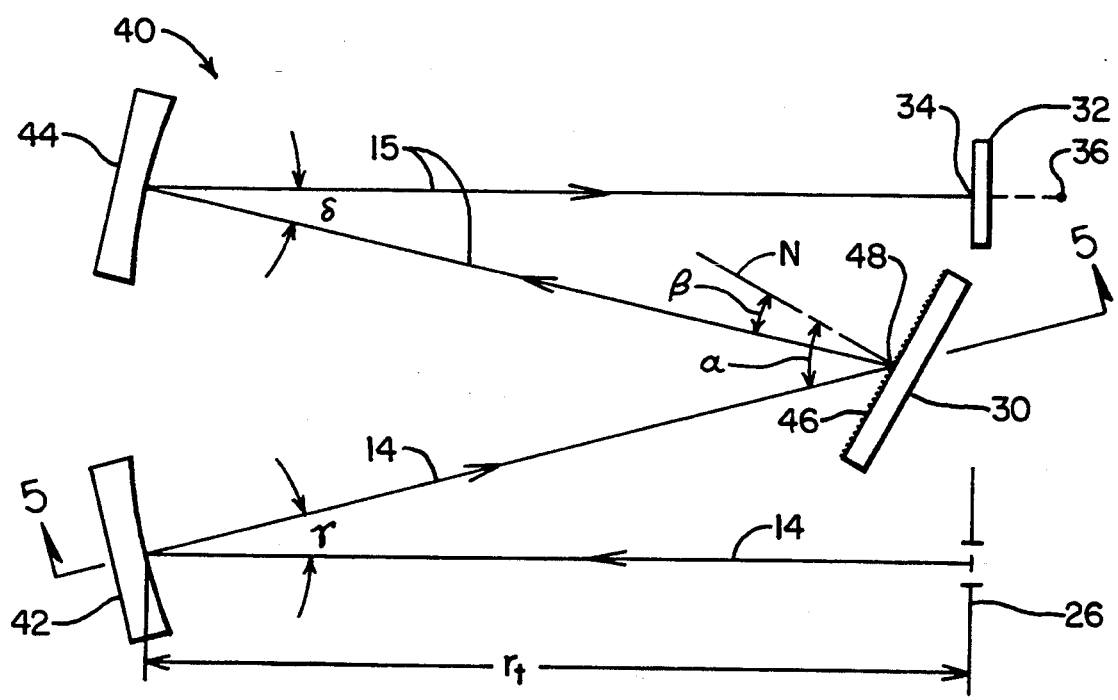
FIG. 3 is a schematic plan view of a Czerny-Turner instrument according to the prior art having separate collimating and focusing mirrors, showing the path of a principal ray through the instrument and also showing the displacement of the sagittal focus, shown in broken lines, from the tangential focus, shown in solid lines.

Another well-known type of spectrometric instrument 40, based on the Czerny-Turner mounting is shown in FIG. 3. This instrument 40 is essentially an Ebert-type device, but with the large single mirror replaced by two smaller spherical concave mirrors 42, 44. Other than replacing the large single mirror of the Ebert system with the two smaller mirrors 42, 44, the Czerny-Turner mounting is identical to an Ebert mounting. That is, source illumination to be studied, such as beam 14, is imaged through an entrance skit at the entrance pupil 26 and is collimated and reflected to a plane diffraction grating 30 by mirror 42. The diffracted light is then collected and focused by mirror 44 onto a suitable detector, such as photographic plate 32. The Czerny-Turner mounting also suffers from astigmatism, with the tangential focus 34 occurring at the surface of the detector and the sagittal focus 36 occurring behind the detector. See FIG. 3. Note also that only the principle ray of beam 14 is shown in the Czerny-Turner system of FIG. 3 for simplicity.

Both the Ebert system 20 and the Czerny-Turner system 40 utilize a plane diffraction grating 30 having a plurality of diffractive elements or fine rulings 46 inscribed thereon. The centermost of these rulings 46 may be referred to as the central ruling 48. In the typical Ebert and Czerny-Turner systems shown in FIGS. 2 and 3, the centerline of the incident beam 14, having passed through entrance pupil 26 and after being reflected and collimated by either mirror 28 or mirror 42, strikes the central ruling 48 of grating 30 at an angle of incidence $\alpha$ as measured from the normal axis N of grating 30. See FIG. 3. After striking the surface of grating 30, the centerline of the incident beam 14 is diffracted at a diffraction angle $\beta$, forming a diffracted beam 15.

While the schematic representations of FIGS. 2 and 3 provide a general orientation to the respective Ebert and Czerny-Turner systems 20 and 40, the one-dimensional incident and diffracted beams 14, 15, illustrated as boundary rays in FIG. 2, and as the centerline ray in FIG. 3 for convenience in later describing the displaced tangential and sagittal foci 34 and 36, are schematic only and are not intended to show the components of the beams. In reality, the incident beam may be comprised of one or many wavelength components, depending on the light source or projecting apparatus used. For example, if the light from a distant star is to be investigated, the projecting apparatus could be a telescope to gather and focus the image of the star at the entrance pupil 26. Similarly, a microscope objective lens assembly could be used to focus the parallel, coherent beam of a laser at the entrance pupil 26 so that the entire surface of the grating 30 would be illuminated by the beam instead of merely a small point on the grating surface. As would be known to persons having ordinary skill in this art, the entrance pupil 26 may or may not be required in a particular spectrographic system depending on the application. If an entrance pupil 26 is used, it could take the form of an elongated slit or it could be a simple circular aperture. The specific shape of the pupil 26 would be selected by the spectroscopist according to the desired application. By way of example only, an elongated entrance slit is usually used in monochromators to make as much light available as possible to overcome the disadvantageous astigmatism present in these prior art systems.

As mentioned above, in such prior art systems as described above, only that component of the diffracted beam 15 perpendicular to the grating rulings 46, i.e., the tangential focus 34, occurs at the surface of the detector, such as photographic plate 32. The parallel component, i.e., the sagittal focus 36 is astigmatic and does not fall into focus on the detector. Instead, the sagittal focus 34 usually has a longer focal length and occurs some distance behind the detector, as best seen in FIGS. 2 and 3. The resulting images of the diffracted beam 15 therefore appear on the detector as respective lines, rather than as respective points.

Figure 4:
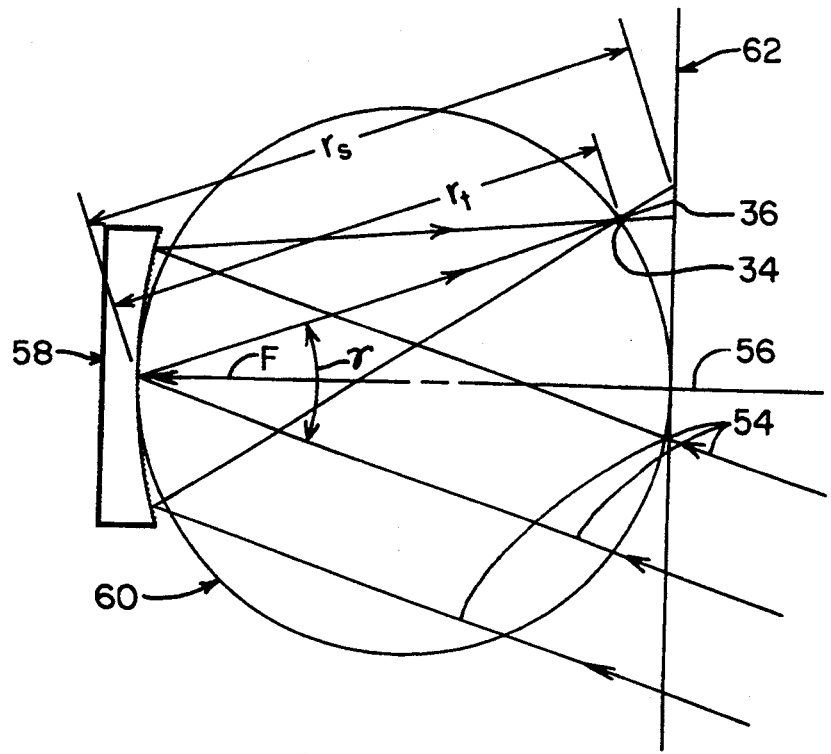
FIG. 4 is a schematic plan view showing the astigmatism introduced by the off-axis use of a spherical mirror and also showing the loci of the sagittal and tangential foci.

The astigmatism phenomenon associated with these prior art systems is a direct result of the off-axis use of the spherical concave mirrors and is best understood by referring to FIG. 4. A collimated light beam 54 strikes surface of spherical mirror 58 at a non-zero angle of incidence, that is, the incident beam 54 is off-axis. The incident light 54 is reflected through a total angle of 3' and is focused by the mirror 58. In this type of off-axis use, the uncorrected spherical mirror 58 is incapable of stigmatic focusing. That is the tangential focus 34 and the sagittal focus 36 occur at different locations in space. The result is two focused images at different points in space, with each image being elongated in shape rather than a point focus. Since FIG. 4 is a plan view, the image at the tangential focus 34 is an elongated line perpendicular to the plane of the paper, while the image at the sagittal focus 36 is an elongated line in the plane of the paper, as shown. The locus of tangential foci 60 forms a circle having a diameter equal to the focal length F of mirror 58, while the locus of sagittal foci 62 is a straight line tangent to the locus of tangential loci 60 at the optical axis 56. Therefore, the amount of astigmatism, i.e., the distance between the tangential focus 34 and the sagittal focus 36 increases rapidly as the total reflection angle $\gamma$ is increased.

The foregoing astigmatism phenomenon occurs in both the Ebert system 20 shown in FIG. 2 and the Czerny-Turner system 40 of FIG. 3. In fact, because that astigmatism results from the off-axis use of spherical concave mirrors, any spectrometric instrument using off-axis spherical mirrors will suffer from astigmatism, and may be improved by substituting a modified grating according to this invention. Instruments with astigmatism focus light in a line, not a point, therefore, any diffracted images appearing on the surface of detector 32 appear as a plurality of lines. Since the energy present in each particular line image is stretched out along a line instead of concentrated at a point, it has less intensity and is more difficult to detect with electronic transducers and more susceptible to interference from extraneous noise which are problems inherent in astigmatic spectroscopy.

With the preceding discussion of known prior art instruments and principles in mind, the details of the stigmatic and near stigmatic imaging system 10 according to the present invention can now be described in detail. As was mentioned above, the stigmatic and near stigmatic imaging system 10 shown in FIG. 1 is a "test rig" and is configured to demonstrate the astigmatism reduction possible by replacing the plane diffraction grating of a conventional Ebert system with the modified diffraction grating 12 according to the principles of this invention. However, as is well-known in the art, numerous configurations of such spectrometric instruments are possible depending on the desired use, and persons having ordinary skill in this art could readily provide the required components for any number of applications after having become familiar with the details of this invention. Further, such a modified replacement diffraction grating 12 could be used just as easily with a Czerny-Turner or any other prior art spectrometric device utilizing plane diffraction gratings and spherical mirrors. Therefore, the stigmatic and near stigmatic imaging system 10 should not be regarded as limited to the particular configurations shown and described herein.

Referring now to FIG. 1, the stigmatic and near stigmatic imaging system 10 according to the present invention comprises a conventional instrument housing 11 in which is mounted a single mirror 28 having a spherical concave reflecting surface 13. Housing 11 also contains a mounting 17 for the modified cylindrical diffraction grating 12 as well as an entrance aperture 26 and exit aperture 16. Just outside each aperture is the focal plane P in which are contained the graticule plate assembly 27 and translucent screen 18. In the "test rig" embodiment shown in FIG. 1, the graticule plate assembly 27 includes two individual graticule plates 29, 31 each having a plurality of parallel opaque lines ruled on their respective surfaces. The plates are placed face-to-face and are orientated orthogonally, so that the lines are perpendicular and form a grid pattern of horizontal and vertical lines. In order to determine the quality of the diffracted image achieved by this modified instrument, a translucent screen 18 is placed adjacent the exit aperture 16 on focal plane P. If the correct amount of astigmatic power correction has been incorporated into the modified grating, as will be described in detail below, the image of the graticule plates will be stigmatic, i.e., the image will appear through the microscope assembly as a square grid pattern, with both the horizontal and vertical lines in perfect or near perfect focus.

After confirming that the modified apparatus is producing a suitable stigmatic or near stigmatic image, the graticule plate assembly 27 and translucent screen 18 may be removed and replaced with whatever components are deemed necessary by the spectroscopist for a particular application. In operation, then, an incident light beam 14 may be projected by a conventional projecting apparatus, such as any of those described above, through entrance pupil 26 and onto the surface 13 of spherical concave mirror 28. The mirror 28 collimates the incident beam 14 and reflects it back to modified diffraction grating 12 having astigmatic power correction, where the beam is diffracted and separated into its component wavelengths. The diffracted beam 15 then goes back to the spherical mirror 28 where it is reflected and passes through an exit pupil or aperture 16 and is stigmatically focused on the surface of a suitable detector that is coplanar with normal focal plane P. Alternatively, the spectroscopist may choose to keep the translucent screen 18 and use the microscope assembly 19 to study the diffracted image, either with his eye, a camera, or some other device (not shown).

In accordance with the objects of this invention, one of the best ways of correcting the astigmatism in the class of spectrometric systems using off-axis spherical mirrors is to introduce a astigmatic power correction to the diffraction grating to either decrease the sagittal focal length or increase the tangential focal length. Adding such astigmatic power to the grating only and not to the spherical mirror allows nearly any such prior art instrument to be easily and quickly modified to reduce or eliminate astigmatism without the need to refocus or recalibrate the instrument. Further, because the single mirror of Ebert systems cannot be practically distorted to improve stigmatic imaging, as described above, replacement of the plane grating of such systems with a modified grating according to the present invention will allow spectroscopists to reduce or eliminate the astigmatism found in their Ebert type systems, which they could not otherwise accomplish.

Figure 6:
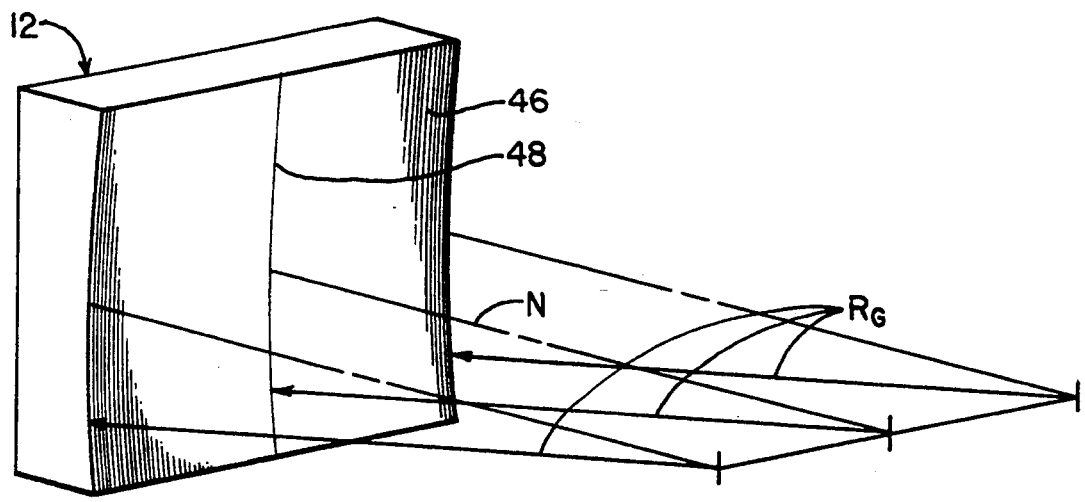
FIG. 6 is a perspective view of a cylindrical diffraction grating according to the present invention having astigmatic power correction along one axis only.

As an additional consideration, since nearly every existing Ebert and Czerny-Turner system already locates the detection apparatus at the tangential focus, it would be most advantageous to introduce the astigmatic power correction by introducing circular curvature, i.e., by curving the surface of the grating 12 in the line length direction, as best seen in FIG. 6, so that there is no need to refocus these existing instruments. As described above, then, the conventional plane gratings in these instruments could be replaced with modified gratings to reduce or eliminate astigmatism without requiring that they be refocused. Further, introducing curvature to the grating in the line length direction results in only minimal changes in spectral resolution and does not change the wavelength scale linearity.

While the particular embodiment 10 shown in FIG. 1 is applied to a spectrograph of the Ebert-type, it is advantageous to use the Czerny-Turner mounting shown in FIG. 3 to describe how to determine the amount of astigmatic power correction required for the modified grating 12 (FIG. 1 ), since the amount of correction depends on the characteristics of the collimating and focusing mirrors. In some Czerny-Turner systems, the collimating and focusing mirrors have identical characteristics, and, therefore, the amount of astigmatic power correction would be the same as for a single mirror Ebert system with the same mirror characteristics. However, if the characteristics of the two mirrors are not identical, then the following description provides a means whereby the correct amount of astigmatic power correction can be determined.

While the precise amount of astigmatic power correction that needs to be incorporated into the modified grating depends on the characteristics of the spherical concave mirror or mirrors used in the instrument, it also depends on the particular diffraction order desired to be stigmatically focused. Spectrograph design equations governing the particular incidence and diffraction angles for given diffraction orders are well-known in the an and can be found in any number of optics publications and textbooks. Referring now to FIG. 4, assume that it is desired to shorten the sagittal focal length $r_s$ of an off-axis spherical mirror system to make it coincident with the tangential focal length $r_t$. The length of the tangential focus $r_t$ for a given spherical mirror is given by the well-known equation:

$$r_t = F \cos(\gamma/2) \quad (1)$$

where $\gamma$ is defined as the total angle of reflection off a given spherical mirror, as shown in FIG. 4, and F is the nominal focal length of the collimating and focusing surfaces, i.e., F is one half of the surface radius R. Similarly, as is also well-known, the equation for the sagittal focus is given by the following equation:

$$r_s = \frac{F}{\cos\left(\frac{\gamma}{2}\right)} \quad (2)$$

Figure 5:
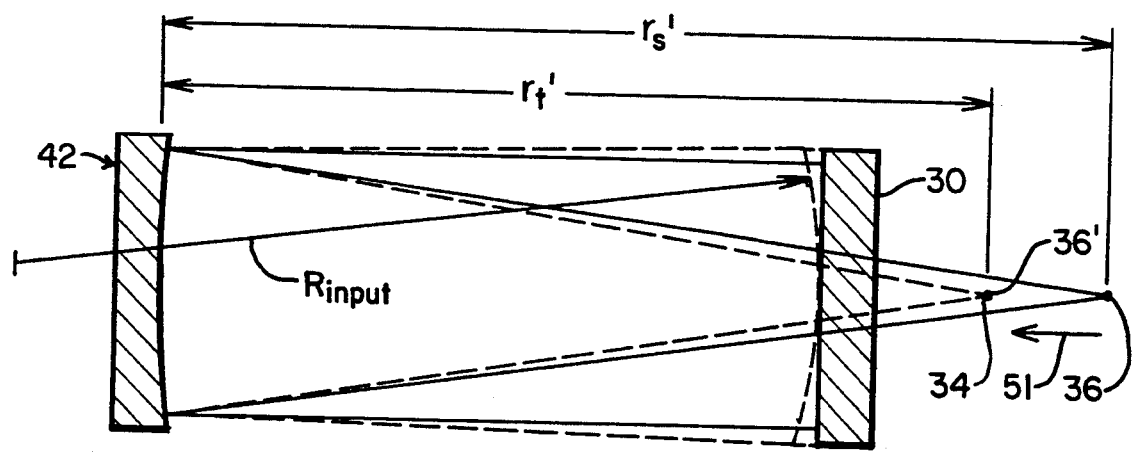
FIG. 5 is a sectional view in elevation taken along the line 5—5 of the Czerny-Turner instrument of FIG. 3, showing the relocation of the sagittal focus on the input leg by introducing astigmatic power connection to the diffraction grating.

Referring now to FIGS. 3 and 5 simultaneously, the cylindrical curvature of the central ruling 48 of the grating is calculated independently for each leg of the instrument. The input leg is defined as the optical path starting from the entrance aperture 26, reflecting off mirror 42, and back to the grating 30. The output leg is defined as the optical path starting from the grating 30, reflecting off mirror 44, and to sensor 32. Therefore, for the input leg shown in FIG. 5, $r_s'$, which is the projection of $r_s$ along the line 5—5 of FIG. 3, is $r_s \cos\gamma$, therefore, the sagittal focus distance $r_s'$ in FIG. 5 is given by:

$$r_s' = \frac{F \cos\gamma}{\cos\left(\frac{\gamma}{2}\right)} \quad (3)$$

In order to cancel the astigmatism, the sagittal focus 36 needs to be moved in the direction of arrow 51 to a new location 36' that it is coincident with the tangential focus 34. As was the case above, $r_t'$, which is the projection of $r_t$ along the line 5—5 of FIG. 3 is $r_t \cos\gamma$, thus:

$$r_t' = F \cos\gamma \cos(\gamma/2) \quad 4)$$

Moving the sagittal focus 36 in the direction of arrow 51 to a new point 36' coincident with the tangential focus 34 creates a virtual focus (not shown) located at a distance v behind mirror 42, and is given by the well-known lens equation:

$$v = \frac{1}{\left(\frac{1}{r_t'} - \frac{1}{r_s'}\right)} \quad (5)$$

Therefore, in the view shown in FIG. 5, the radius of the curved rulings should be $R_{input} = v + q$, where q is the distance from the mirror 42 to the grating 30.

The output leg of the instrument shown in FIG. 3 is analyzed in exactly the same manner, and will yield the same radius $R_{output}$ if the characteristics of the focusing mirror 44 are the same as for mirror 42. Regardless of whether the mirror characteristics are identical, the correction radii for the two legs, i.e., $R_{input}$ and $R_{output}$, are averaged to a radius of intermediate sagittal depth by taking the harmonic mean of the two radii:

$$R_{R_{avg}} = \frac{2}{\left(\frac{1}{R_{R_{input}}} + \frac{1}{R_{R_{output}}}\right)} \quad (6)$$

The true radius of the grating surface $R_G$, i.e., the radius in the plane of its normal N (See FIG. 6), is given by correcting $R_{R\ avg}$ by the cosine of the bisector of the incidence and diffraction angles $\alpha$ and $\beta$ (FIG. 3), respectively:

$$R_G = R_{R_{avg}} \cos\left(\frac{\alpha + \beta}{2}\right) \quad (7)$$

This equation 7 allows the correct circular curvature of the modified grating 12 to be determined that will move the sagittal focus 36 ($r_s$ in the above equations), to the tangential focus 34 ($r_t$ in the above equations). This simple one-dimensional curvature along the line length direction yields a modified cylindrical grating 12 shown in FIG. 6.

Figure 7:
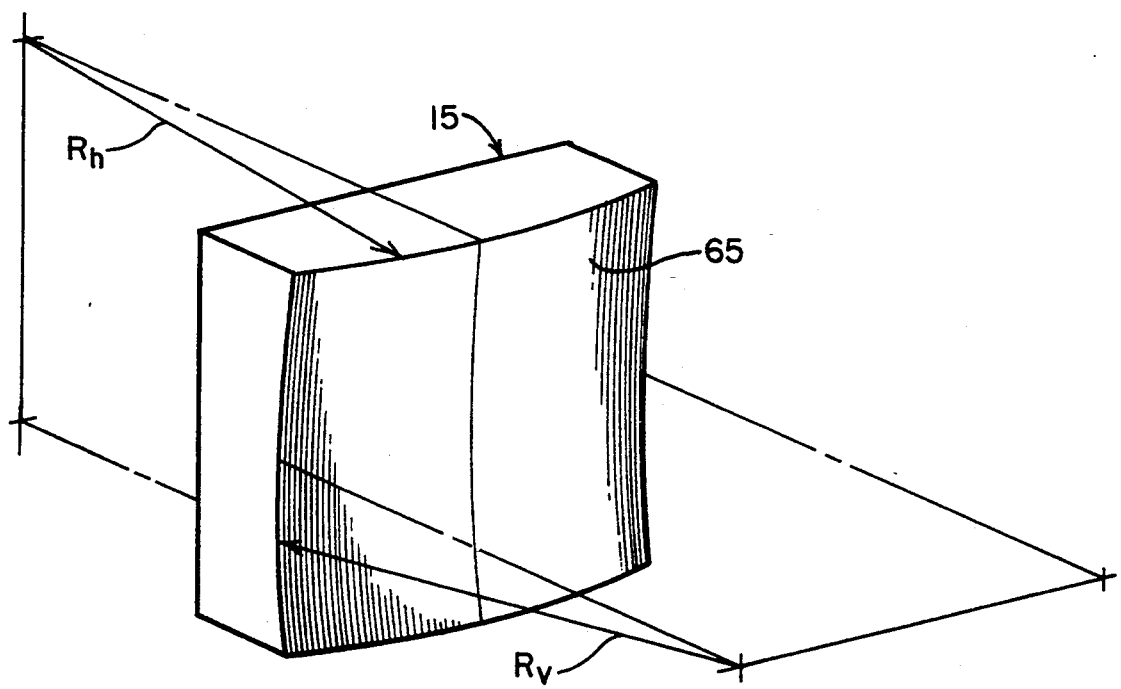
FIG. 7 is a perspective view of an alternate embodiment of a toroidal diffraction grating according to the present invention having astigmatic power correction of opposite sign along two orthogonal axes.

Alternatively, it should be noted that it is also possible to move the tangent focus 34 to the sagittal focus 36 by introducing opposite circular curvature along the orthogonal axis of the grating, i.e., perpendicular to the line length direction. Another possibility would be to introduce some amount of circular curvature in both orthogonal grating axes to produce a diffraction grating 15 having a toroidal surface 65, as shown in FIG. 7. With such a toroidal grating 15, it is possible to move the tangential focus 34 toward the sagittal focus 36, while moving the sagittal focus toward the tangential focus 34, thus "splitting the difference," or causing the two foci to converge somewhere between their original locations. Still another possibility is to form a surface that is overall slightly concave or convex, but with differing radii of curvature according to the following equations. With this type of toroidal surface, both the sagittal and tangential foci would be moved to a location either fully "inside" or fully "outside" their normal locations. The respective radii of curvature for each axis, $R_v$ and $R_h$ are related to the single-dimension true radius $R_G$ determined above, and are found by using the sagittal depth averaging properties of the harmonic mean, thus:

$$R_G = \frac{1}{\left(\frac{1}{R_v} - \frac{1}{R_h}\right)} \quad (8)$$

where $R_v$ is the vertical or line length direction radius and $R_h$ is the horizontal or dispersion direction radius. See FIG. 7. In all cases a positive radius value is concave and a negative value is convex. Rewriting equation (8) as two separate equations:

$$R_v = \frac{1}{\left(\frac{1}{R_h} + \frac{1}{R_G}\right)} \quad (9a)$$

-continued $$R_h = \frac{1}{\left(\frac{1}{R_v} - \frac{1}{R_G}\right)} \quad (9b)$$

Note that equations 9a and 9b are indeterminate. That is, if a given $R_h$ places the tangential focus where desired, then $R_v$ may be calculated from equation 9a and vice-versa for equation 9b.

Figure 8:
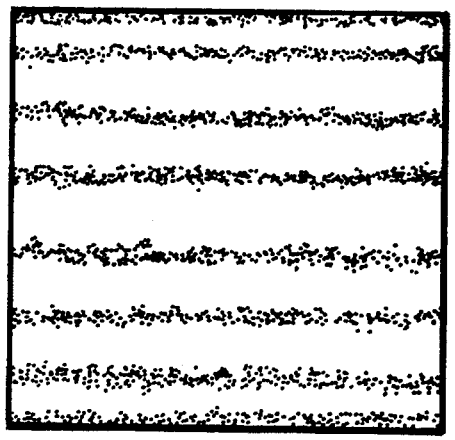
FIG. 8 is a pictorial representation of the interferometric fringe pattern on the surface of the cylindrical diffraction grating of FIG. 6.
Figure 9:
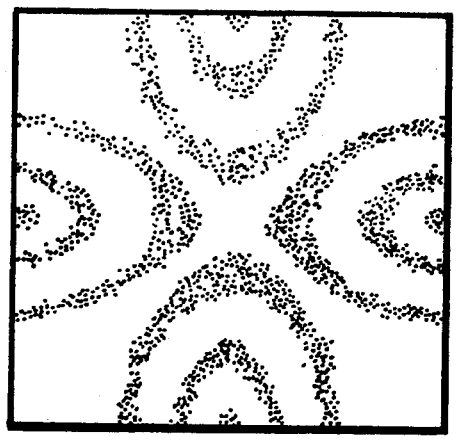
FIG. 9 is a pictorial representation of the interferometric fringe pattern on the surface of the toroidal diffraction grating of FIG. 7.
Figure 10:
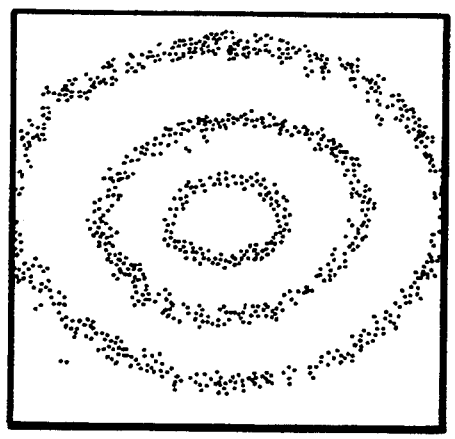
FIG. 10 is a pictorial representation of the interferometric fringe pattern on the surface of a toroidal diffraction grating having astigmatic power correction in addition to curvatures of the same signs along two orthogonal axes.

After the desired form and radius or radii of the modified gratings have been selected and established in accordance with the above-listed equations, well known optical interferometry methods and apparatus can be used to precisely measure when the correct surface curvatures have been achieved by observing the fringe patterns produced on the surfaces of the gratings. For example, FIG. 8 shows a typical fringe pattern that would be produced by the pure cylindrical grating 12 shown in FIG. 6. Similarly, FIG. 9 shows a typical fringe pattern that would be produced by the toroidal grating 15 of FIG.7 having circular curvatures of opposite signs introduced on orthogonal axes.

This completes the detailed description of the preferred embodiments according to the present invention. Note that the substitution of cylindrical or toroidal gratings may be made in Ebert, Czerny-Turner, and other plane grating spectrographs utilizing off-axis spherical mirrors to reduce or eliminate astigmatism. As described herein, spectroscopists may optionally use a purely cylindrical grating, such as grating 12, to move the sagittal focus to the tangential focus, or vice-versa, a toroidal grating having radii of curvatures of opposite signs introduced on orthogonal axes to move both the tangential focus and the sagittal focus together at some point between their respective original, uncorrected locations, or a toroidal grating having radii of curvatures of the same sign introduced on orthogonal axes to move both the tangential focus and the sagittal focus together at some point outside of their respective original, uncorrected locations. Further, because this invention achieves stigmatic imaging by curving the grating surface, it is possible to correct the astigmatism in Ebert mountings having only a single minor.

The foregoing is considered illustrative only of the principles of the invention. Further, since numerous modifications and changes will readily occur to those skilled in the art, it is not desired to limit the invention to the exact construction and operation shown and described and accordingly, all suitable modifications and equivalents may be resorted to as falling within the scope of the invention as defined by the claims which follow.

The embodiments of the invention in which an exclusive property or privilege is claimed are defined as follows:

1. Astigmatism-corrected spectrographic apparatus comprising:
    collimating means for collimating a beam of light passing through an entrance aperture;
    focusing means for collecting and focusing diffracted light through an exit aperture; and
    diffraction means having a curved surface with a plurality of diffraction rulings inscribed thereon and also having a plane of dispersion, said diffraction means being positioned with respect to said collimating means so that said collimating means directs the collimated beam of light onto the curved surface of said diffraction means, said diffraction means also being positioned with respect to said focusing means so that said focusing means collects and focuses the diffracted light from said diffraction means to a tangential focus and a sagittal focus which are substantially coincident, wherein the curved surface of said diffraction means has a vertical radius of curvature that is substantially parallel to the direction of the diffraction rulings, said vertical radius of curvature having the effect of moving the sagittal focus to about the tangential focus and being defined by the equation:

$$R_v = R_{Ravg}\cos\left(\frac{\alpha + \beta}{2}\right)$$

where:
  $R_v$=said vertical radius of curvature;
  $R_{Ravg}$=is a harmonic mean of a calculated input correction radius for an input leg and a calculated output correction radius for an output leg, the calculated input correction radius being given by the sum of the distance from said collimating means to a virtual focus of the entrance aperture through said collimating means in a plane orthogonal to the plane of dispersion of said diffraction means and the distance between said diffraction means and said collimating means, and the calculated output correction radius being given by the sum of the distance from said focusing means to a virtual focus of the exit aperture through said focusing means in a plane orthogonal to the plane of dispersion of said diffraction means and the distance between said diffraction means and said focusing means;
  $\alpha$=the angle of incidence of the collimated light beam with respect to said diffraction means; and
  $\beta$=the angle of diffraction.

2. Astigmatism-corrected spectrographic apparatus, comprising:
    collimating means for collimating a beam of light passing through an entrance aperture:
    focusing means for collecting and focusing diffracted light through an exit aperture; and
    diffraction means having a curved surface with a plurality of diffraction rulings inscribed thereon end also having a plane of dispersion, said diffraction means being positioned with respect to said collimating means so that said collimating means directs the collimated beam of light onto the curved surface of said diffraction means, said diffraction means also being positioned with respect to said focusing means so that said focusing means collects and focuses the diffracted light from said diffraction means to a tangential focus and a sagittal focus which are substantially coincident, wherein the curved surface of said diffraction means has a horizontal radius of curvature that is substantially orthogonal to the direction of the diffraction rulings, said horizontal radius of curvature having the effect of moving the tangential focus to about the sagittal focus and being defined by the equation:

$$R_h = -R_{Ravg}\cos\left(\frac{\alpha+\beta}{2}\right)$$

where:
R$_h$ = said horizontal radius of curvature;
R$_{Ravg}$ = is a harmonic mean of a calculated input correction radius for an input leg and a calculated output correction radius for an output leg, the calculated input correction radius being given by the sum of the distance from said collimating means to a virtual focus of the entrance aperture through said collimating means in a plane orthogonal to the plane of dispersion of said diffraction means and the distance between said diffraction means and said collimating means, and the calculated output correction radius being given by the sum of the distance from said focusing means to a virtual focus of the exit aperture through said focusing means in a plane orthogonal to the plane of dispersion of said diffraction means and the distance between said diffraction means and said focusing means;
$\alpha$ = the angle of incidence of the collimated light beam with respect to said diffraction means; and
$\beta$ = the angle of diffraction.

3. Astigmatism-corrected spectrographic apparatus, comprising:
collimating means for collimating a beam of light passing through an entrance aperture;
focusing means for collecting and focusing diffracted light through an exit aperture; and
diffraction means having a curved surface with a plurality of diffraction rulings inscribed thereon and also having a plane of dispersion, said diffraction means being positioned with respect to said collimating means so that said collimating means directs the collimated beam of light onto the curved surface of said diffraction means, said diffraction means also being positioned with respect to said focusing means so that said focusing means collects and focuses the diffracted light from said diffraction means to a tangential focus and a sagittal focus which are substantially coincident, wherein the curved surface of said diffraction means has a vertical radius of curvature that is substantially parallel to the direction of the diffraction rulings and a horizontal radius of curvature that is substantially orthogonal to the direction of the diffraction rulings, said vertical radius of curvature and said horizontal radius of curvature having the effect of moving the both the tangential focus and the sagittal focus, so that the sagittal and tangential foci converge, and wherein said vertical radius of curvature and said horizontal radius of curvature are defined by the equations:

$$R_v = \frac{1}{\left(\frac{1}{R_h} + \frac{1}{R_G}\right)}$$

$$R_h = \frac{1}{\left(\frac{1}{R_v} - \frac{1}{R_G}\right)}$$

where:

$$R_G = R_{Ravg}\cos\left(\frac{\alpha+\beta}{2}\right)$$

and where:
R$_G$ = an equivalent single-dimension radius of curvature of said diffraction means that would be required to converge the sagittal and tangential foci;
R$_{Ravg}$ = is a harmonic mean of a calculated input correction radius for an input leg and a calculated output correction radius for an output leg, the calculated input correction radius being given by the sum of the distance from said collimating means to a virtual focus of the entrance aperture through said collimating means in a plane orthogonal to the plane of dispersion of said diffraction means and the distance between said diffraction means and said collimating means, and the calculated output correction radius being given by the sum of the distance from said focusing means to a virtual focus of the exit aperture through said focusing means in a plane orthogonal to the plane of dispersion of said diffraction means and the distance between said diffraction means and said focusing means;
$\alpha$ = the angle of incidence of the collimated light beam with respect to said diffraction means; and
$\beta$ = the angle of diffraction.

4. Astigmatism-corrected spectrographic apparatus, comprising:
collimating means for nominally collimating a beam of light passing through an entrance aperture;
focusing means for collecting and focusing nominally collimated diffracted light to an exit aperture;
a plane of astigmatism that contains all central rays to and from said collimating means and said focusing means; and
diffraction means having a curved surface with a plurality of diffraction rulings inscribed in said curved surface for diffracting the beam of light and also having a plane of dispersion defined as being a plane orthogonal to said rulings and containing a vector perpendicular to the curved surface, said diffraction means being positioned with respect to said collimating means so that said collimating means directs the nominally collimated beam of light onto the curved surface of said diffraction means, said diffraction means also being positioned with respect to said focusing means so that said focusing means collects and focuses the nominally collimated diffracted light from said diffraction means to said exit aperture, said curved surface of said diffraction means being curved in a plan orthogonal to said plane of astigmatism with a radius of curvature R$_{PO}$ defined by the equation:

$$R_{PO} = R_{Ravg}\cos\left(\frac{\alpha+\beta}{2}\right)$$

where:
R$_{Ravg}$ = is a harmonic mean of a calculated input correction radius for an input leg that comprises said collimating means and a calculated output correction radius for an output leg that comprises said focusing means, the calculated input correction radius being given by the sum of the distance from said collimating means to a virtual focus of the entrance aperture through said collimating means in a plane orthogonal to said plane of astigmatism and the distance between said diffraction means and said collimating means, when said entrance aperture is positioned, for purposes of calculation, at a distance from said collimating means which would most completely collimate the beam between said collimating means and said diffraction means in said plane of astigmatism, and the calculated output correction radius being given by the sum of the distance from said focusing means to a virtual focus of the exit aperture through said focusing means in a plane orthogonal to said plane of astigmatism and the distance between said diffraction means and said focusing means, when said exit aperture is positioned, for purposes of calculation, at a distance from said focusing means which would most completely collimate the beam between said diffraction means and said focusing means in said plane of astigmatism;

$\alpha$ = the angle of incidence of the collimated light beam with respect to said diffraction means, measured in said plane of dispersion; and $\beta$ = the angle of diffraction.

5. Astigmatism-corrected spectrographic apparatus, comprising:

collimating means for nominally collimating a beam of light passing through an entrance aperture;

focusing means for collecting and focusing nominally collimated diffracted light to an exit aperture;

a plane of astigmatism that contains all central rays to and from said collimating means and said focusing means; and diffraction means having a curved surface with a plurality of diffraction rulings inscribed in said curved surface for diffracting the beam of light and also having a plane of dispersion defined as being a plane orthogonal to said rulings and containing a vector perpendicular to the curved surface, said diffraction means being positioned with respect to said collimating means so that said collimating means directs the nominally collimated beam of light onto the curved surface of said diffraction means, said diffraction means also being positioned with respect to said focusing means so that said focusing means collects and focuses the nominally collimated diffracted light from said diffraction means to said exit aperture, said diffraction means curved in said plane of astigmatism with a radius of curvature $R_{PA}$ defined by the equation:

$$R_{PA} = R_{Ravg} \cos\left(\frac{\alpha + \beta}{2}\right)$$

Where:

$R_{Ravg}$ = is a harmonic mean of a calculated input correction radius for an input leg that comprises said collimating means and a calculated output correction radius for an output leg that comprises said focusing means, the calculated input correction radius being given by the sum of the distance from said collimating means to a virtual focus of the entrance aperture through said collimating means in a plane orthogonal to said plane of astigmatism and the distance between said diffraction means and said collimating means, when said entrance aperture is positioned, for purposes of calculation, at a distance from said collimating means which would most completely collimate the beam between said collimating means and said diffraction means in said plane of astigmatism, and the calculated output correction radius being given by the sum of the distance from said focusing means to a virtual focus of the exit aperture through said focusing means in a plane orthogonal to said plane of astigmatism and the distance between said diffraction means and said focusing means, when said exit aperture is positioned, for purposes of calculation, at a distance from said focusing means which would most completely collimate the beam between said diffraction means and said focusing means in said plane of astigmatism;

$\alpha$ = the angle of incidence of the collimated light beam with respect to said diffraction means, measured in said plane of dispersion; and $\beta$ = the angle of diffraction.

6. Astigmatism-corrected spectrographic apparatus, comprising:

collimating means for nominally collimating a beam of light passing through an entrance aperture;

focusing means for collecting and focusing nominally collimated diffracted light to an exit aperture;

a plane of astigmatism that contains all central rays to and from said collimating means and said focusing means; and diffraction means having a curved surface with a plurality of diffraction rulings inscribed in said curved surface for diffracting the beam of light and also having a plane of dispersion defined as being a plane orthogonal to said rulings and containing a vector perpendicular to the curved surface, said diffraction means being positioned with respect to said collimating means so that said collimating means directs the nominally collimated beam of light onto the curved surface of said diffraction means, said diffraction means also being positioned with respect to said focusing means so that said focusing means collects and focuses the nominally collimated diffracted light from said diffraction means to said exit aperture, said diffraction means being curved in said plane of astigmatism with a radius of curvature $R_{PO}$ and in a plane orthogonal to said plane of astigmatism with a radius of curvature $R_{PA}$, where said radii $R_{PO}$ and $R_{PA}$ are defined by the equations:

$$R_{PO} = \frac{1}{\left(\frac{1}{R_{PA}} + \frac{1}{R_G}\right)}$$

$$R_{PA} = \frac{1}{\left(\frac{1}{R_{PO}} + \frac{1}{R_G}\right)}$$

where:

$$R_G = R_{Ravg} \cos\left(\frac{\alpha + \beta}{2}\right)$$

and where:

$R_{Ravg}$ = is a harmonic mean of a calculated input correction radius for an input leg that comprises said collimating means and a calculated output correction radius for an output leg that comprises said focusing means, the calculated input correction radius being given by the sum of the distance from said collimating means to a virtual focus of the entrance aperture through said collimating means in a plane orthogonal to said plane of astigmatism and the distance between said diffraction means and said collimating means, when said entrance aperture is positioned, for purposes of calculation, at a distance from said collimating means which would most completely collimate the beam between said collimating means and said diffraction means in said plane of astigmatism, and the calculated output correction radius being given by the sum of the distance from said focusing means to a virtual focus of the exit aperture through said focusing means in a plane orthogonal to said plane of astigmatism and the distance between said diffraction means and said focusing means, when said exit aperture is positioned, for purposes of calculation, at a distance from said focusing means which would most completely collimate the beam between said diffraction means and said focusing means in said plane of astigmatism;

$\alpha$ = the angle of incidence of the collimated light beam with respect to said diffraction means, measured in said plane of dispersion; and $\beta$ = the angle of diffraction.

* * * * *

UNITED STATES PATENT AND TRADEMARK OFFICE
CERTIFICATE OF CORRECTION

PATENT NO. : 5,384,656
DATED : January 24, 1995
INVENTOR(S) : John P. Schwenker

It is certified that error appears in the above-indentified patent and that said Letters Patent is hereby corrected as shown below:

In column 4, line 44, change "pan" to --part--.

In column 5, line 27, change "Czemy-Turner" to --Czerny-Turner--.

In column 5, line 29, change "connection" to --correction--.

In column 7, line 18, change "an" to --art--.

In column 7, line 35, change "skit" to --slit--.

In column 8, line 42, change "3'" to --$\gamma$--.

In column 8, line 57, change "loci" to --foci--.

In column 11, line 10, change

"$r_t = F \cos(\gamma/2)$                    (1)"

UNITED STATES PATENT AND TRADEMARK OFFICE
CERTIFICATE OF CORRECTION

PATENT NO. : 5,384,656
DATED : January 24, 1995
INVENTOR(S) : John P. Schwenker

It is certified that error appears in the above-indentified patent and that said Letters Patent is hereby corrected as shown below:

to $$--r_t = F\cos(\frac{\gamma}{2}) \qquad (1)--$$

In column 11, line 48, change

"$r_s' = F \cos\gamma\cos(\gamma/2) \qquad 4$)"

to $$--r_t' = F\cos\gamma\cos(\frac{\gamma}{2}) \qquad (4)--$$

In column 11, line 56, change

"$v = \dfrac{1}{\left(\dfrac{1}{r_f'} - \dfrac{1}{r_s'}\right)} \qquad (5)$"

UNITED STATES PATENT AND TRADEMARK OFFICE
CERTIFICATE OF CORRECTION

PATENT NO. : 5,384,656
DATED : January 24, 1995
INVENTOR(S) : John P. Schwenker

It is certified that error appears in the above-identified patent and that said Letters Patent is hereby corrected as shown below:

to $$--v = \frac{1}{(\frac{1}{r'_t} - \frac{1}{r'_s})} \quad (5)--$$

In column 12, line 28, change "tangent" to --tangential--.

In column 13, line 26, change "Czerny-Tumer" to --Czerny-Turner--.

In column 13, line 43, change "minor" to --mirror--.

In the Claims:

In column 14, line 51, change "end" to --and--

Signed and Sealed this

Twentieth Day of June, 1995

Attest:

BRUCE LEHMAN

*Attesting Officer*     *Commissioner of Patents and Trademarks*